July 2, 1968  L. L. McCORMICK ET AL  3,390,900
SELF-LOCKING CONNECTOR
Filed June 3, 1966
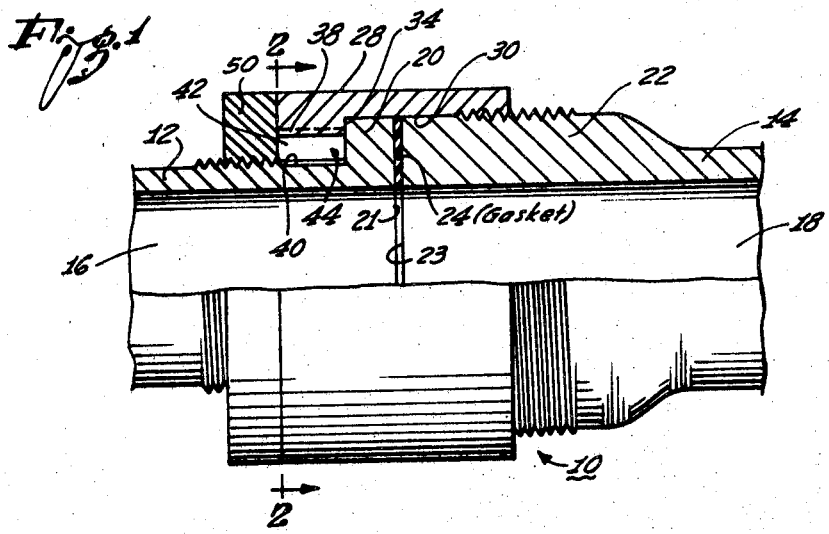
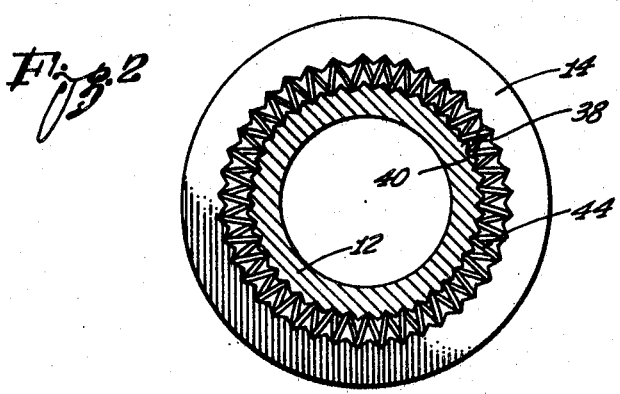
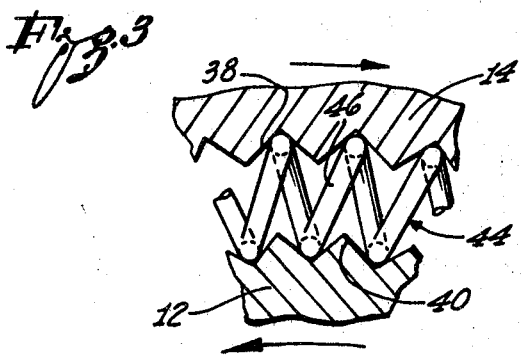
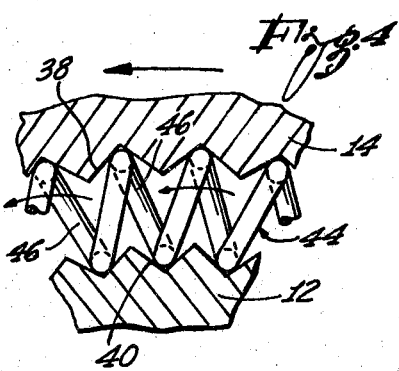
INVENTORS
JOHN J. PHILLIPS
LARRY L. McCORMICK
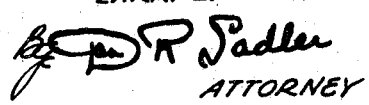
ATTORNEY

United States Patent Office 3,390,900
Patented July 2, 1968

3,390,900
SELF-LOCKING CONNECTOR
Larry L. McCormick, Los Angeles, and John J. Phillips, Rolling Hills, Calif., assignors to Gray & Huleguard, Santa Monica, Calif., a corporation of California
Filed June 3, 1966, Ser. No. 555,149
1 Claim. (Cl. 285—81)

ABSTRACT OF THE DISCLOSURE

In a threaded coupling, a garter spring is provided between a pair of concentric races carried by the threaded members whereby the convolutions of the spring act as wedge members for locking the threaded members together. The threaded members may be released by exerting sufficient force to the coupling to move the convolutions over dead center.

It is common to secure a pair of mating members like pipes, hoses, electrical cables, etc. together by means of a threaded coupling. A coupling of this nature normally includes a first threaded fitting such as a collar that is rotatably mounted on one of the mating members. The fitting is then threaded onto the other member to secure them together.

Numerous methods have been proposed to insure the mating members being locked together whereby they can not accidentally be loosened as a result of vibrations etc. One method that has been employed is to attach a keeper to the coupling. These keepers commonly employ cotter pins, keys, backup nuts, lock washers, etc. Although these have been effective for some purposes, they require extra parts and extra assembly operations.

In order to avoid the foregoing difficulties, it has also been proposed to use various forms of self locking fasteners. These fasteners normally have employed some form of mechanical interference that creates a binding action of sufficient magnitude to prevent vibrations loosening the members. The interference can be produced by various forms of plastic inserts, irregular threads, etc. Self locking fasteners of this variety also have been effective for some applications. However under some circumstances the members become so locked together it is extremely difficult, if not impossible, to separate them. Moreover, each time the fastener is used the interference normally results in some damage to the threads, the plastic insert etc. whereby they cannot be reused. It will thus be seen that prior self locking arrangements have not been entirely satisfactory.

The present invention provides means for overcoming the foregoing difficulties. More particularly, the present invention provides a self locking coupling which is not only economical and capable of being reused a large number of times, but is also reliable in operation. In the single embodiment of the invention disclosed herein this is accomplished by providing a coupling having a rotatable fitting adapted to be threaded onto a mating member for securing them together. A locking device such as a garter spring is disposed adjacent the fitting so as to engage a race thereon. When the fitting is tightened the spring will slide on the race without interferring with the tightening. However, if the fitting tends to rotate in the opposite direction the spring will wedge against the race and prevent the coupling loosening.

These and other features and advantages of the present invention will become readily apparent from the following detailed description of one embodiment thereof, particularly when taken in connection with the accompanying drawings wherein like reference numerals refer to like parts and wherein:

FIGURE 1 is a side view, with a portion thereof broken away, of a coupling means embodying one form of the present invention,
FIGURE 2 is an end view of the coupling,
FIGURE 3 is a fragmentary cross sectional view on a greatly enlarged scale of a portion of the coupling during one operating condition, and
FIGURE 4 is a fragmentary cross sectional view similar to FIGURE 3 but showing the coupling during a different operating condition.

Referring to the drawings in more detail the present invention is particularly adapted to be embodied in a coupling 10 for interconnecting a pair of mating members together. These mating members may be of any desired variety such as a nut and bolt, a pair of hoses, a pair of electrical connectors, etc.

In the present instance the two members 12 and 14 are illustrated as being conduits or tubular members having passages 16 and 18 extending axially therethrough. The passages 16 and 18 may be employed for containing a plurality of electrical wires, for carrying a liquid, etc.

The first member 12 includes a radially outwardly projecting flange 20 on its end. The end of the flange 20 forms a planar surface 21 normal to the axis of the member 12.

The second member 14 also includes an enlarged end 22 that forms a plane surface 23. Normally this surface 23 will abut against the surface 21 on the flange 20. If so desired a resilient sealing member or gasket 24 may be disposed between the two mating surfaces 21 and 23. The exterior of enlarged end 22 may include suitable fastening means such as a set of threads 26.

The coupling 10 includes a fitting such as a collar 28. The collar 28 is rotatably mounted on the end of the first member 12. The collar 28 includes a passage 30 having an inside diameter that slidably fits over the periphery of the flange 20.

The end of the passage 30 is internally threaded 32 to mate with the set of threads 26 on the enlarged end 22 of the member 14. The opposite end of the passage 30 includes a shoulder 34 which mates with the radial flange 20.

As a consequence the collar 28 may be threaded onto the member 14 whereby the flange 20 will be drawn toward the end of the member 14 and the gasket 24 is compressed between surfaces 21 and 23.

In order to insure the collar 28 being retained in position after it has been tightened, self locking means 36 may be provided. In the present instance this includes an outer race 38 on the member 12 adjacent to the flange 20 and an inner race 40 on the collar 28. These two races 38 and 40 are aligned with each other to provide a locking space 42 therebetween.

The self locking means 36 also includes a wedge means that fits into the space 42 between the two races 38 and 40. The wedge means is effective to allow the collar 28 to be rotated freely in one direction but is effective to restrain movement in the opposite direction. The present wedge means is a flexible coil spring 44 that may be threaded onto itself so as to form an endless garter or annulus.

The spring 44 may be of a more or less conventional nature and formed from a single wire. The wire is wound into a spiral to form a series of substantially identical convolutions or coils 46. Each of these coils 46 is normally at a predetermined angle to the axis of the spring 44. This angle is, of course, determined by the pitch of the spiral.

Since the spring 44 and the various coils 46 therein are of a resilient nature the individual coils 46 may be deflected from their normal angle. In fact, if enough force is applied, the coils 46 may be moved over center so that they are at an opposite angle to the axis.

The inner and outer diameter of the garter or annulus formed by the spring are preferably somewhat greater and less than the inner and outer race respectively. As a consequence when the spring is in position the coils will bear firmly against the inner and outer races. In fact this may be effective to cause the coils of the spring to be cocked or canted between the two races at a slightly greater angle to their axis than in their normal or free state.

Once the collar 28 and the spring 44 are in position, a retaining member 50 may be secured to the first member 12 so as to retain the collar 28 in positon. In the present instance the member 50 is threaded onto the exterior of the member 12 so as to abut against the end of the collar 28. This retaining member 50 slides against the end of the collar 28 so as not to interfere with the free rotation of the collar.

In order to employ the present coupling 10 for securing the members 12 and 14 together, the gasket 24 is placed on the end of the flange 20 and the enlarged end 22 forced thereagainst. The collar 28 is then slipped over the enlarged end 22 and onto the threads 26. The collar 28 is then tightened until the gasket 24 is compressed between surfaces 21 and 23 and the members 12 and 14 are secured together.

As the collar 28 is rotated to tighten it, the various coils 46 of the spring 44 will slide along the two races 38 and 40. After the collar 28 is tightened and the members 12 and 14 locked together, if the collar 28 tends to rotate in the opposite direction the coils 46 will wedge between the two races 38 and 40. This will produce a locking force that prevents loosening of the collar 28.

In order to insure the wedging action occurring, the races 38 and 40 may be serrated to produce grooves 48 for receiving the edges of the coils 46. The locking force is adequate to prevent the collar 28 accidentally unwinding as a result of vibrations etc.

If it is desired to disassemble the coupling 10 a substantial torque may be applied to the collar 28 whereby a large force is applied to the coils 46. This force tends to rotate the coils 46 from their normal position and if these forces are large enough the coils 46 will move over center and into the release position in FIGURE 4. When the coils 46 are at this new angle, if the collar 28 is rotated in the new direction, the coils 46 will slide on the races 38 and 40 and not interfere with the decoupling. Accordingly once the collar 28 is broken loose it may easily be rotated to disassemble the coupling 10.

Since the spring 44 is flexible and resilient, even though the coils 46 have been moved into the released position of FIGURE 4, as soon as the collar 28 is rotated in the tightening direction the coils 46 will immediately rotate into their original position. As a consequence the coupling 10 may be reused as many times as desired and the self locking action will always be maintained.

It can be appreciated that the characteristics of the spring, the spacing between the races etc. may be designed to provide any desired degree of self locking action. In fact the locking action can be made so strong as to make it virtually impossible to even intentionally unlock the coupling.

While only a single embodiment of the present invention is disclosed herein, it will be readily apparent to persons skilled in the art that numerous changes and modifications can be made thereto without departing from the spirit of the invention. For example the arrangement of the collar, the races, the characteristics of the springs etc. may be varied to suit any particular requirement. Accordingly the foregoing disclosure and description thereof are for illustrative purposes only and do not limit the invention which is defined only by the claim which follows.

We claim:
1. A self-locking coupling including the combination of:
   a first member,
   a second member adapted to mate with the first member,
   a set of external threads on the first member,
   a collar rotatably mounted on the second member, said collar being locked against axial movement of said second member,
   a set of internal threads on one end of said collar adapted to mate with the threads on the first member, said collar when rotated in a first direction being effective to thread said collar onto said first member for fastening the first and second members together, said collar when rotated in a second direction being effective to unthread from the second member and release said members,
   concentric mating races on the collar and second member to form a clearance space therebetween, said races being adjacent the end of said collar remote from said internal threads and including a series of serrations on the facing surfaces thereof, said second member having a radially projecting, circumferentially extending flange at the inner end thereof, said race on said collar being of less diameter than the outer diameter of said flange, thereby forming a radial shoulder on the inner surface of said collar, said radial shoulder and the axially outer surface of said flange being in abutment when said collar is fully threaded onto said first member whereby said first and second members are fastened together and said concentric races are opposingly positioned to form said clearance space,
   a spiral spring disposed in said clearance space and having a plurality of resilient coils which are compressed in a radial direction between said races, said coils normally being in a first position where they are inclined in the direction of threading rotation of said collar, said coils when at said normal angle being positioned to slide on said races when said collar is rotated in said threading direction, said coils being adapted to become wedged between said races when said collar is rotated in the unthreading direction to thereby prevent said collar being unthreaded unless the torque on the collar produces a sufficient force on the coils to move them past the position where they are perpendicular to the inner surface of said collar to a second position where they are inclined in the direction of unthreading rotation of said collar, said serrations on said races receiving said coils and thereby preventing said spring from sliding on said races when said coils are wedged between said races and during the movement of said coils from said first inclined position to said second inclined position.

References Cited

UNITED STATES PATENTS

| | | | |
|---|---|---|---|
| 2,390,103 | 12/1945 | Johnson | 285—89 |
| 2,881,819 | 4/1959 | Devaux | 151—25 |
| 2,886,089 | 5/1959 | Schlage | 151—25 |

FOREIGN PATENTS

| | | |
|---|---|---|
| 1,221,842 | 9/1962 | France. |
| 8,890 | 4/1909 | Great Britain. |
| 79,904 | 1/1935 | Sweden. |

CARL W. TOMLIN, *Primary Examiner.*

R. G. BERKLEY, *Assistant Examiner.*